United States Patent Office 3,240,812
Patented Mar. 15, 1966

3,240,812
PREPARATION OF OMEGA-HALO-UNDECYLALKYLKETONES
Pierre Lafont, Lyon, and Yannik Bonnet, Tassin-la-Demi-Lune, Rhone, France, assignors to Societe des Usines Chimiques Rhone-Poulenc, Paris, France, a French body corporate
No Drawing. Filed Nov. 27, 1961, Ser. No. 155,196
Claims priority, application France, Dec. 6, 1960, 846,055
3 Claims. (Cl. 260—593)

This invention relates to new omega-halo-undecylalkyl-ketones, their production and their use.

According to a first feature of the present invention there are provided, as new chemical compounds, omega-haloketones of the Formula I:

$$R-CO-(CH_2)_{10}-CH_2X \quad (I)$$

wherein R represents an alkyl group containing from 1 to 5 carbon atoms and X represents a chlorine or bromine atom.

The said omega-halo-undecylalkylketones are valuable intermediate products for use in organic synthesis. Furthermore, they are of value in the preparation of artificial musks, which are valuable in perfumery. For example, it is possible, by condensing these haloketones with a malonic diester and then saponifying and decarboxylating them by known methods, to obtain ketonic acids of the type: $HOOC-(CH_2)_{12}-CO-R$ which, after reduction to alcohol-acids and cyclisation by conventional methods, can be used in the preparation of macrocyclic lactones having a strong musky odour.

In United States patent specifications Nos. 2,675,402 and 2,691,682, there is described the preparation of aliphatic omega-haloketones by rearrangement of certain 1-alkylcycloalkyl hypohalites of which the ring comprises from 4 to 8 carbon atoms. The said hypohalites are obtained by the action of a halogen on a mixture of 1-alkylcycloalkanol and an alkali-metal hydroxide in aqueous solution.

However, this mode of operation is not applicable to the preparation of 1-alkylcyclododecanols. Thus, for example, the hypochlorites corresponding to these alcohols appear to be completely unstable and are spontaneously converted, even at a temperature in the neighbourhood of 0° C., into monochloroketones, which in turn absorb chlorine and are rapidly converted into polychloroketones.

According to a further feature of the present invention there is provided a method for the preparation of omega-halo-undecylalkylketones of Formula I which comprises passing a current of carbon dioxide through a vigorously agitated mixture of an aqeous alkali-metal hypochlorite or hypobromite solution and a solution of a 1-alkylcyclododecanol, of which the alkyl group contains 1 to 5 carbon atoms, in an inert organic solvent, the mixture being maintained at 20–25° C. and the reaction being effected in the absence of actinic light, e.g. in darkness.

As organic solvents for use in the preparation of the products of Formula I, there may be used any organic solvents which are inert under the operating conditions, more especially the lower chlorinated aliphatic hydrocarbons, such as carbon tetrachloride and chloroform.

The hypochlorite or hypobromite used is preferably sodium or potassium hypochlorite or hypobromite. It is advantageous to use concentrated aqueous solutions of these hypohalites, for example a hypochlorite of 47–50 chlorometric degrees. The molar proportion of hypohalite to 1-alkylcyclododecanol is preferably between 2 and 3, while the molar proportion of $CO_2$ to hypohalite may be from 1.5 to 2.

According to a further aspect of the invention there are provided, as new chemical compounds, the 1-alkyl-cyclododecanols of Formula II:

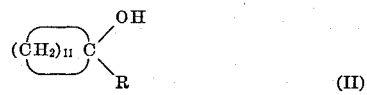

(II)

in which R has the meaning assigned to it above.

According to a still further feature of the invention there is provided a method for the production of compounds of Formula II which comprises reacting an alkyl-magnesium halide, such as the chloride, bromide or iodide with cyclododecanone, and hydrolysing the complex compound thus obtained.

The following examples will serve to illustrate the invention:

Example I

Into a 1-litre spherical flask provided with a reflux condenser, a dropping funnel, a stirrer and a gas bubbler are introduced 150 cc. of carbon tetrachloride and then 19.8 g. (0.1 mole) of 1-methylcyclododecanol. After dissolution, there are introduced 200 cc. of an aqueous sodium hypochlorite solution, representing 0.03 mole of NaOCl. The flask is kept in darkness and a current of carbon dioxide is bubbled through it for 4 hours with vigorous stirring. There is thus passed a total quantity of carbon dioxide corresponding to an excess of about 100% in relation to the quantity of sodium hypochlorite. The stirring is continued for 2 days in darkness, and the reaction mass is then decanted and the organic layer extracted and then washed with water and dried over calcium chloride.

Infra-red spectroscopy of the liquid obtained does not reveal the characteristic band of the hypochlorite, but it shows the characteristic band of the ketone grouping $>C=O$.

The carbon tetrachloride is evaporated and the residual oil, amounting to 23.75 g., is distilled under a pressure of 0.25 mm. Hg. There is thus obtained a middle fraction of 20.95 g., which is a colourless liquid boiling between 120° and 125° C. under the indicated pressure, and analysis of which corresponds to the formula $C_{13}H_{25}OCl$.

When treated with sodium acetate in acetic acid and then saponified, this compound yields 1-hydroxy-12-tridecanone, of which the melting point, 56° C., corresponds to that indicated in the literature for this hydroxyketone prepared by an entirely different method [M. Stoll, Helv. Chim. Acta 34, 1817 (1951)]. It is thus confirmed that the middle fraction consists of 1-chloro-12-tridecanone.

The 1-methylcyclododecanol employed as starting material was prepared in the following manner:

Into a spherical flask of the same type as that previously described are introduced 16 g. of magnesium and 200 cc. of dry diethyl ether. There are then gradually added, in half an hour, 94 g. of methyl iodide in solution in 200 cc. of dry ether. After complete dissolution of the magnesium there is introduced, in 1 hour, a solution of 91 g. of cyclododecanone in 200 cc. of dry diethyl ether. The mixture is then heated under reflux for 15 hours. The complex magnesium compound precipitates. It is hydrolysed at 0° C. by treatment with 2 N hydrochloric acid at a pH of 5 and then decanted. The ethereal layer is washed with water and then with an aqueous sodium thiosulphate solution and again with water. It is thereafter dried over anhydrous calcium chloride and the ether is then evaporated. The residue, when twice recrystallised from a 50/50 mixture of ether and petroleum ether (35–50° C. fraction), gives 85 g. of 1-methylcyclododecanol, M.P. 94–95° C.

Example II

By proceeding in the same way as before, but using only 110 cc. of Javelle water of 47–50 chlorometric degrees, representing about 0.2 mole of NaOCl, and bubbling the carbon dioxide through for 22 hours, there are obtained 23.6 g. of 1-chloro-12-tridecanone.

We claim:
1. A process for the production of an omega-haloketone of the formula:

$$R-CO-(CH_2)_{10}-CH_2X$$

wherein R is an alkyl group of 1 to 5 carbon atoms and X is an atom selected from the class consisting of chlorine and bromine atoms, which comprises passing a current of carbon dioxide through a mixture of a solution of a 1-alkylcyclododecanol, of which the alkyl group contains 1 to 5 carbon atoms, in an inert organic solvent and a concentrated aqueous solution of a hypohalite selected from the class consisting of alkali metal hypochlorites and hypobromites, the mixture being maintained at 20–25° C. and the reaction being effected in the absence of actinic light.

2. A process according to claim 1, wherein the molar proportion of hypohalite to 1-alkylcyclododecanol is between 2 and 3.

3. A process according to claim 1 wherein the molar proportion of carbon dioxide to hypohalite is between 1.5 and 2.

References Cited by the Examiner
UNITED STATES PATENTS

| | | | |
|---|---|---|---|
| 2,554,980 | 5/1951 | Fauque | 260—593 |
| 2,566,792 | 9/1951 | Dannenberg | 260—593 |
| 2,921,966 | 1/1960 | Carbon et al. | 260—617 |
| 2,987,556 | 6/1961 | Brill | 260—617 |

FOREIGN PATENTS 861,979  3/1961  Great Britain.

OTHER REFERENCES

Rabjohn et al.: J. Am. Chem. Soc. 76, 1280–1282 (1954).

LEON ZITVER, *Primary Examiner.*

DANIEL D. HORWITZ, *Examiner.*